(12) United States Patent
Jean-Marc et al.

(10) Patent No.: US 7,660,954 B2
(45) Date of Patent: Feb. 9, 2010

(54) TECHNIQUES FOR SAVING DATA

(75) Inventors: Delbosc Jean-Marc, Paris (FR);
Azambre Hubert, Les Ulis (FR);
Blanchet Claude, Saint-Cheron (FR)

(73) Assignee: EMC Corporation, Hopkinton, MA (US)

( * ) Notice: Subject to any disclaimer, the term of this patent is extended or adjusted under 35 U.S.C. 154(b) by 296 days.

(21) Appl. No.: 10/343,893

(22) PCT Filed: Jul. 24, 2001
(Under 37 CFR 1.47)

(86) PCT No.: PCT/FR01/02420
§ 371 (c)(1),
(2), (4) Date: Sep. 10, 2003

(87) PCT Pub. No.: WO02/12993
PCT Pub. Date: Feb. 14, 2002

(65) Prior Publication Data
US 2006/0190680 A1 Aug. 24, 2006

(30) Foreign Application Priority Data
Aug. 4, 2000 (FR) .................... 00 10353

(51) Int. Cl.
*G06F 12/00* (2006.01)
(52) U.S. Cl. ............ 711/162; 711/111; 711/163
(58) Field of Classification Search ............. 711/162
See application file for complete search history.

(56) References Cited

U.S. PATENT DOCUMENTS

| | | | | |
|---|---|---|---|---|
| 4,467,421 A * | 8/1984 | White | ............ | 711/118 |
| 4,918,588 A * | 4/1990 | Barrett et al. | ............ | 707/10 |
| 5,293,627 A * | 3/1994 | Kato et al. | ............ | 713/503 |
| 5,384,673 A * | 1/1995 | Yoshioka et al. | ............ | 360/72.2 |
| 5,666,531 A * | 9/1997 | Martin | ............ | 707/204 |
| 5,748,874 A * | 5/1998 | Hicksted et al. | ............ | 714/24 |
| 5,764,972 A * | 6/1998 | Crouse et al. | ............ | 707/1 |
| 5,805,864 A * | 9/1998 | Carlson et al. | ............ | 703/24 |
| 5,809,511 A * | 9/1998 | Peake | ............ | 707/204 |
| 5,907,672 A * | 5/1999 | Matze et al. | ............ | 714/8 |
| 5,940,849 A * | 8/1999 | Koyama | ............ | 711/4 |
| 6,023,709 A * | 2/2000 | Anglin et al. | ............ | 707/204 |
| 6,043,948 A * | 3/2000 | Takayama | ............ | 360/69 |
| 6,226,728 B1 * | 5/2001 | See et al. | ............ | 711/171 |
| 6,285,518 B1 * | 9/2001 | Zweighaft | ............ | 360/25 |
| 6,385,706 B1 * | 5/2002 | Ofek et al. | ............ | 711/162 |
| 6,496,791 B1 * | 12/2002 | Yates et al. | ............ | 703/25 |
| 6,557,073 B1 * | 4/2003 | Fujiwara et al. | ............ | 711/111 |
| 6,711,343 B1 * | 3/2004 | Matsumi et al. | ............ | 386/46 |

FOREIGN PATENT DOCUMENTS

WO WO9844423 10/1998

* cited by examiner

*Primary Examiner*—Matt Kim
*Assistant Examiner*—Michael C Krofcheck
(74) *Attorney, Agent, or Firm*—Muirhead and Saturnelli, LLC

(57) ABSTRACT

The invention concerns a system for saving data derived from a mainframe characterized in that it comprises a computer equipment including an input/output interface for exchanging data with the guest computer, said interface comprising a backup document reader/inscriber emulator, at least one intermediate storage device and a tape document reader/inscriber, the equipment further comprising a processor for transfer between the input/output interface or the intermediate storage device and the key-to-tape reader/inscriber, the system further including a supervisor comprising a storage unit for recording data concerning key-to-tape recordings of the computer equipment, and for controlling said computer equipment according to instructions coming from the guest computer.

20 Claims, 2 Drawing Sheets

100

| V1 | B1 | V2 | B2 | V3 | B3 | V4 | B4 | V5 | B5 |

TECHNIQUES FOR SAVING DATA

CROSS-REFERENCE TO RELATED APPLICATIONS

This application is a national phase filing of and claims the benefit of priority to International Application Number PCT/FR01/02420, filed Jul. 24, 2001, entitled or "Systeme de Stockage Virtuel," which translates to "Virtual Storage System".

This application also relates to the following co-pending applications: 1) International Application Number PCT/FR01/02381, filed Jul. 20, 2001, entitled or "Procede de Sauvegarde de Donnees Informatiques," which translates to "Method for Saving Computer Data"; 2) International Application Number PCT/FR01/01324, filed Apr. 27, 2001, entitled or "Système de sauvegarde et de restauration automatique de données provenant d'une pluralité d'équipements hôtes en environnement hétérogène" or "Backup and restore system for data derived from a plurality of host equipment in heterogeneous environment".

The entire disclosure contained in each of the above-mentioned patent applications is incorporated by reference as if set forth at length herein.

STATEMENT REGARDING FEDERALLY SPONSORED RESEARCH OR DEVELOPMENT

Not applicable

REFERENCE OF A "MICROFICHE APPENDIX"

Not applicable

FIELD OF THE INVENTION

This invention relates to the domain of storage of computer data, and more specifically to storage on media such as large capacity cassettes, by remote equipment usually including a cassette manipulation robot.

BRIEF DESCRIPTION OF THE PRIOR ART

International Published Application No. WO9844423 discloses a computer network comprising a number of storage control units, each being coupled to a plurality of storage assemblies, the said assemblies comprising at least one high capacity memory device (MSD). Each storage control unit may be coupled to at least one host processing system and at least one other storage control unit to control access of host processing systems to high capacity memory devices. Several data copies are stored in storage assemblies that are geographically remote from each other, so that any host can access any copy. Each storage control unit comprises an interface with a host that emulates a high capacity memory device independent of the type of storage device and an interface with a local storage assembly that emulates a host independent of the host type. Hosts access stored data by means of virtual addressing. Storage control units make automatic backups and error corrections and protect backup copies in write.

U.S. Pat. No. 5,809,511 discloses a system for transfer of data from a host station and complementary equipment comprising cache memory and robot controlled backup support management equipment.

SUMMARY OF THE INVENTION

The purpose of the invention is to provide an improved backup system that can be used by a heterogeneous set of host computers connected to a common non-specific backup equipment. Generally, the invention relates to a system for the backup of data originating from a host computer [mainframe] characterised in that it comprises computer equipment including an input-output interface for exchanging data with the host computer, the said interface comprising a backup reader-inscriber emulator, at least one hard disk and a tape reader-inscriber, the equipment also comprising a processor for making transfers between the input-output interface or the tape reader interface, and the tape reader-inscriber, the system also comprising a supervisor comprising a memory for saving information about records on the computer equipment tape, and to control the said computer equipment as a function of instructions originating from the host computer.

Advantageously, the emulator is composed of a computer for analysing signals originating from the host computer and for generating a response corresponding to the type of simulated cassette reader-inscriber.

The invention also relates to a process for backing up data from a host computer [mainframe] characterised in that input-output interface of a backup equipment is emulated so that behaviour of the backup equipment towards the host machine is identical to a streamer, the said backup equipment comprising an intermediate storage means that is not a streamer.

BRIEF DESCRIPTION OF THE DRAWINGS

The present invention will be better understood after reading the description given below of a non-limitative example of the embodiment with reference to the appended drawings in which:

FIG. 2 shows an aspect of the present invention constructed according to the teachings herein.

DETAILED DESCRIPTION OF THE INVENTION

Figure 1:
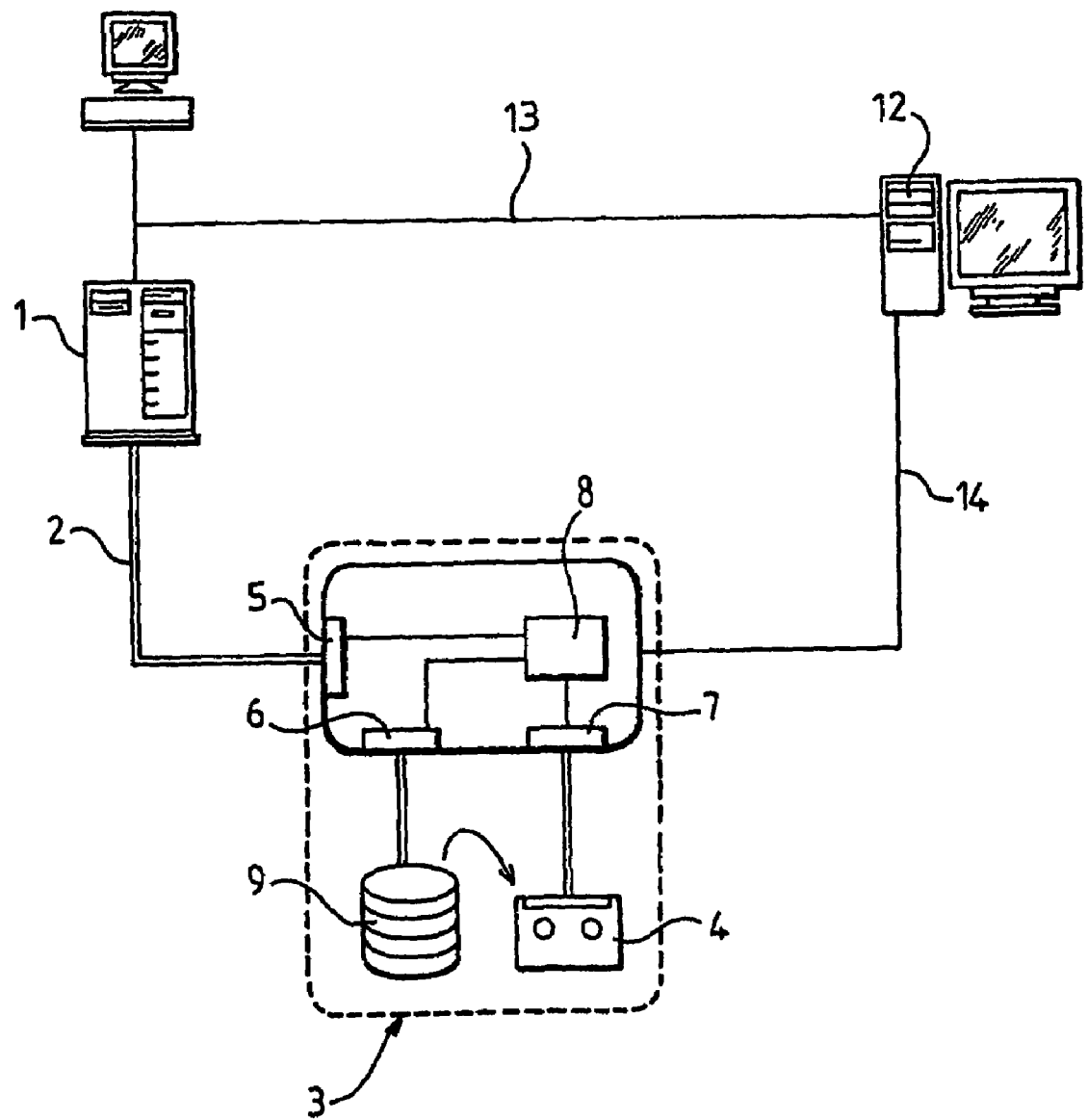
FIG. 1 shows the principle diagram of the present invention.

The system described in the following is used to backup data originating from a heterogeneous set of "mainframe" type host machines (1) connected to an SCSI type computer network (2).

The backup equipment (3) comprises one or several streamers (4) for backing up data on a magnetic medium.

It is connected to the network through an emulated input-output interface circuit (5) such that the backup equipment (3) is seen by the host machine in the form of an emulated type streamer, for all functions performed by the backup equipment (3). The emulated interface emulates the main known streamers, to enable a transparent dialogue between the host machine and the backup equipment (3).

The backup equipment (3) also comprises at least one intermediate storage device (9) composed of RAID hard disks in the described example.

The backup equipment includes initiators (6, 7) for each of the backup media. A computer controls the different resources to transfer data from the input-output interface (5) to the intermediate storage device (9) and vice versa, and to transfer data from the intermediate storage device (9) to streamers (4) and vice versa.

Seen from the host machine, the backup equipment according to the invention satisfies the following specifications:

It has exactly the same behaviour as the streamer that it replaces.

It improves the data storage speed through a disk cache. Data are stored on a disk partition, in order to accelerate backing up and restoring the data. Data access is improved by means of a metamodel of backed up data that memorizes the data mapping. This metamodel enables direct access to sequentially stored data.

It copies the data onto a streamer. Data backed up on the disk partition are copied onto the tape, reproducing the initial write mechanism by using the model.

It enables persistence and coherence of the data. At the end of the backup, the backup equipment guarantees the persistence and coherence of data on the tape and in the partition. It also makes it possible to decorrelate the upstream streamer type (that is being emulated) from the downstream streamer (that is actually being controlled). On the upstream side, the backup equipment manages one streamer model, and backs up data on a another streamer model.

The backup equipment (3) makes the following connection types:

on the upstream side: SCSI, FC, ESCON, Bus&Tag
on the downstream side: SCSI, FC.

The backup equipment manages several connections on the upstream and downstream sides simultaneously. Consequently, it executes several transfers in parallel. Each transfer is managed by a transfer unit.

A transfer unit manages three types of links:
link with a host system
link with a partition of a physical disk
link with the streamer.

The system also comprises a supervisor station (12) connected through serial links (13, 14) firstly to the host machine and secondly to the backup equipment.

The emulation consists of simulating the SCSI operation of a streamer with regard to a host machine and managing the SCSI responses to the different requests from the host and backup transfers.

The supervision station (12) controls a database in which the identification labels of the backed up data are stored.

The data volumes written by host machines are initially created in a buffer disk space (9). The maximum size of these volumes is fixed at the time of the configuration of the backup system, and is usually fairly small—of the order of 250 Mbytes. Secondly, one or several copies of the volumes are transferred onto cartridges. Only the actually meaningful data are transferred to tape. Thus, for example, a maximum volume of 250 Mbytes may only actually contain 10 Mbytes of data. In this case, only these 10 Mbytes are transferred to tape, in order to optimise tape space.

The backup equipment uses a data base to internally manage the list of known volumes, by storing a certain amount of information such as:
the name of the volume
the medium on which it is stored (disk, cartridge)
the position on the medium (disk partition number, or logical start and end addresses on the cartridge)
etc.

This information is essential to be able to find a volume.

At the time that data are transferred from the disk cache to cartridges, private data called "Basic data" are added, at the end of the transfer of each volume. These data are only written onto the cartridges, and are ignored during transfers in the reverse direction, in the case in which a volume is transferred from a cartridge to the disk cache, for example to be restored by the host machine. Therefore, they are entirely managed internally by the backup equipment according to the invention and transparently for host machines.

The basic data for a given volume are written in the form of an ASCII character string with the following structure:

Title CR LF VolumeStartposition VolumeEndposition VolumeSize ReaderChannel/
DiskChannel DiskPartition ProcessorNumber
BarCode CartridgeName
CartridgeType SizeUsed CartridgeSize
LoadCounter VolumeName VolumeStatus HostCode CodingType
Writedate Writetime Readdate Readtime
EmptyDate EmptyTime CR LF Title: title indicating the meaning of the following main fields in abbreviated form.
CR: ASCII character code 0x13 (hexadecimal)
LF: ASCII character code 0x10 code (hexadecimal)
    VolumeStartPosition: logical address of the start of the volume on the cartridge.
    VolumeEndPosition: logical address of the end of the volume on the cartridge
    VolumeSize: approximate size of the volume in kbytes.
    ReaderChannel: number of the reader (defined in the HBS configuration) used to make the transfer from the disk cache volume to the cartridge
    DiskChannel: number of the disk (defined in the HBS configuration) in which the volume is located at the time that it is transferred to the cartridge.
    DiskPartition: number of the disk partition in which the volume is located before it is transferred to the cartridge.
    ProcessorNumber: number of the processor used to transfer the volume from the disk cache to the cartridge.
    BarCode: bar code of the cartridge containing the volume.
    CartridgeName: cartridge name, as declared under HBS. This name is independent of the bar code.
    CartridgeType: hexadecimal code indicating the cartridge type. The possible values are as follows:

| | |
|---|---|
| 0x0000001L | operating cartridge |
| 0x00000010L | cartridge with read access |
| 0x00000020L | cartridge with write access |
| 0x00000080L | cartridge being reorganised |
| 0x00000100L | cartridge to be reorganised |
| 0x00000200L | cartridge not to be reused |
| 0x00000400L | blocked empty cartridge |
| 0x00000800L | reorganised cartridge |
| 0x00001000L | archive type cartridge |
| 0x00002000L | mirror type cartridge |
| 0x00010000L | cartridge for DLT reader |
| 0x00020000L | cartridge for Exabyte reader |
| 0x00040000L | cartridge for 3480 reader |
| 0x00080000L | cartridge for 3590 reader |
| 0x01F00000L | mask for number of the archive pool or mirror to which the cartridge belongs. |

The code used for the CartridgeType field may possibly be a combination of the previous values.
    SizeUsed: total size of data stored on the cartridge, in Megabytes.
    CartridgeSize: maximum capacity of the cartridge, in MegaBytes.
    LoadCounter: cartridge load counter. Indicates the number of times that the cartridge was loaded in a reader. These data are used to determine cartridge wear.

VolumeName: volume name, as it is known by the host machine.

VolumeStatus: hexadecimal code indicating the volume status. This code is a combination of indicators for which the access masks and possible values are as follows:

| | |
|---|---|
| 0x0000001L | 1 if the volume is valid, and 0 if it is invalid (old version or logically erased volume) |
| 0x0000008L | 1 if the volume is of the mirror type |
| 0x00000010L | 1 if the volume has a mirror copy on another cartridge |
| 0x00000020L | 1 if a copy of this volume is to be made on a mirror cartridge |
| 0x00001000L | 1 if the volume is of the archive type |
| 0x00002000L | 1 if the volume is shared between several host systems |
| 0x00010000L | 1 if the volume must always be copied on DLT cartridges |
| 0x00020000L | 1 if the volume must always be copied on Exabyte cartridges |
| 0x00040000L | 1 if the volume must always be copied on 3480 cartridges |
| 0x00080000L | 1 if the volume must always be copied on 3590 cartridges. |
| 0x01F00000L | number of the archive pool or mirror (from 0 to 31) |

HostCode: number of the host machine to which the volume belongs, in the HBS configuration.

CodeType: character code used in the volume header (0=ASCII, 1=EBCDIC)

WriteDate: date of the most recent write or modification of the volume by the host machine, in the form yyyy-mm-dd WriteTime: time of the most recent write or modification of the volume by the host machine, in the form hh:mm:ss ReadDate: date of the most recent read access of the volume by the host machine, in the form yyyy-mm-dd ReadTime: time of the most recent read access of the volume by the host machine, in the form hh:mm:ss EmptyDate: date on which the disk cache volume was transferred to the cartridge, in the form dd-mm-yyyy EmptyTime: time at which the disk cache volume was transferred to the cartridge, in the form hh:mm:ss Basic data are cumulative, in order to accelerate the analysis of cartridges in order to reconstruct the database.

Figure 2:
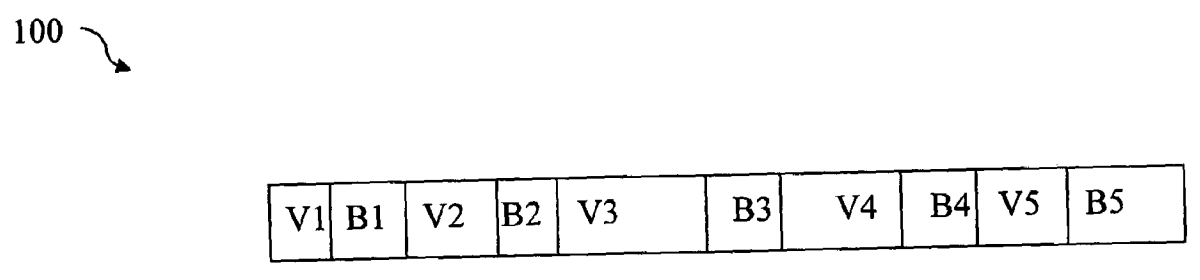

Referring now to FIG. 2, assume that a tape contains volumes V1, V2, V3, V4 and V5. The basic data associated with each of these volumes are called B1, B2, B3, B4 and B5. Therefore, on the tape, the basic data B1 only contain data related to volume B1. The basic data B2 contain the accumulated data for B1 and data about volume V2 in a single data record. Therefore B2 contain data for V1 and V2.

Basic data B3 contain the accumulated data for B2 and data about volume B3 in a single data record. Therefore B3 contains data for V1, V2 and V3.

Therefore the final basic data on the cartridge, B5 in the previous example, contain an accumulated total of all data about all volumes present on the cartridge.

If a cartridge contains a very large number of volumes, the accumulated basic data may be large. In order to limit this increase in size, a maximum size has been arbitrarily fixed at 132 kbytes. When the standard construction of basic data for a volume exceeds 132 kbytes, the equipment (3) assigns reduced basic data to this volume, to contain only basic data for this new volume without accumulating data for previous volumes. For subsequent volumes, the standard mechanism for accumulating data for the current volume with data for the previous volume will be repeated.

If the database in the system is lost completely, the base can be completely reconstructed using these basic data. An integrated function in the processor code is used to analyse a cartridge to extract the most recent basic data from it. This analysis may also be done by an external software; all that is necessary is to move to the end of the tape, to go back one record and read the last data record. The basic data thus retrieved at the end of the cartridge contain a description of the volumes on the cartridge. As described in a previous paragraph, if the Volumeaddress field in the first volume contains a value not equal to zero, then the first volume is not at the beginning of the tape. The conclusion is that the basic data are reduced. In this case, all that is necessary is to go to the cartridge at the address Volumeaddress, and then work backwards from the record to be able to read the basic data for the previous volume. These data are an accumulation of the basic data for the previous volumes.

The backwards analysis of the cartridge must be continued until the basic data with the address Volumeaddress equal to 0 are found for the first volume. All volumes on the cartridge may then be found by accumulating all retrieved basic data.

The base is reconstructed by retrieving all basic data stored on all cartridges in the library, and then using an appropriate software to analyse them. All these data include all data necessary to reconstruct the base. To do this, the first step is to have a list of all volumes contained on all cartridges, and also to determine whether or not each volume of a cartridge is valid for the host machine. The same volume (same name, same host system) may be present on several different cartridges, or at several locations on the same cartridge. This can occur for the following reasons:

either they are several different versions of the same volume that was updated by the host machine several times, or they are the same data that were moved internally by HBS. In all cases, an analysis of the Writedate and Writetime basic data for all occurrences of this volume may be used to determine which is the most recent and therefore the only one that is valid. If the most recent version is present in several locations (same Writedate and Writetime information), any of these occurrences can be used to become the valid version of the volume in the new base. All that is necessary then is to recreate an empty database and fill in all the tables using the collected information.

The invention claimed is:

1. A system for saving data originating from a host computer, the system comprising:
    backup equipment including:
        an input-output interface for exchanging data with the host computer, said input-output interface comprising a backup-reader inscriber emulator, wherein the host computer is one host from a heterogeneous set of host computers of at least two different types, said emulator configured to emulate one or more types of tape devices to enable a transparent dialogue between each of the different types of host computers and the backup equipment when saving data to the backup equipment from said each of the different types of host computers,
        at least one intermediate storage device,
        a tape reader-inscriber; and
        a processor for making transfers between the input-output interface or the intermediate storage device and the tape reader-inscriber, wherein said backup equipment stores a plurality of data portions from the host computer on a tape device, and, following each of said plurality of data portions on the tape device is a corresponding private data portion for said each data portion, said corresponding private data portion for said each data portion including private data about said each data portion and another corresponding private data portion associated with another data portion immediately preceding said each data portion on said tape device, wherein said private data of said corresponding private data portion for said each data portion includes a status code indicating a status of said each data portion, wherein said status code is a combination of bit indicators including an indicator indicating whether said each data portion is always copied on a particular type of tape; and wherein the system also comprises:

a supervisor station, which is a separate component from the backup equipment and is connected to the backup equipment and the host, comprising a memory for saving information about records on a tape of the backup equipment, said supervisor station controlling the backup equipment as a function of instructions originating from the host computer, and a memory for using a database containing identification labels for backed up data.

2. The system for saving data according to claim 1, wherein the emulator includes a computer for analyzing signals originating from the host computer and for generating a response corresponding to a type of simulated cassette reader-inscriber.

3. The system for saving data according to claim 2, wherein the intermediate storage device includes at least one hard disk.

4. The system for saving data according to claim 3, wherein data forming each of the identification labels for a volume of backup data stored therein include a volume name, a medium on which the backed up data is stored, and a position on the medium associated with the backed up data of said each volume stored on the medium.

5. The system for saving data according to claim 1, wherein the intermediate storage device includes at least one hard disk.

6. The system for saving data according to claim 3, wherein data forming each of the identification labels for a volume of backup data stored therein include a volume name, a medium on which the backed up data is stored, and a position on the medium associated with the backed up data of said each volume stored on the medium.

7. The system of claim 5, wherein said private data included in said corresponding private data portion comprises disk information regarding where said each data portion is located on disk at a time said each data portion is transferred from disk to said tape device, and wherein said another corresponding private data portion included in said corresponding private data portion comprises disk information regarding where said another data portion is located on disk at a time said another data portion is transferred from disk to said tape device.

8. The system for saving data according to claim 1, wherein the supervisor station is connected to the backup equipment and to the host computer through serial links.

9. The system for saving data according to claim 1, wherein the backup equipment is connected to the host computer through and SCSI or FC type link.

10. The system of claim 1, wherein said emulator simulates SCSI operation of a tape device which is compatible with the host computer and manages SCSI responses to host requests and backup transfers.

11. The system of claim 1, wherein said emulator manages requests from said host computer to perform a backup operation of data from the host computer.

12. The system of claim 1, wherein said backup equipment includes a first initiator for said at least one intermediate storage device, and a second initiator for said tape reader-inscriber.

13. The system of claim 1, wherein said first corresponding private data portion for said first data portion stored on the tape device represents an accumulation of a plurality of private data portions, each of said plurality of private data portions corresponding to a different one of a plurality of data portions preceding said first data portion on said tape device.

14. The system of claim 1, wherein private data portions stored on the tape device are, used to reconstruct information in the database.

15. The system of claim 1, wherein said private data of said corresponding private data portion for said each data portion includes a bar code of the tape device containing said each data portion.

16. The system of claim 1, wherein said private data of said corresponding private data portion for said each data portion includes a load counter indicating a number of times the tape device containing said each data portion has been loaded in a tape reader, said number of times indicating an amount of wear of the tape device.

17. The system of claim 1, wherein said private data of said corresponding private data portion for said each data portion includes a code, in accordance with a system configuration, of the host computer to which said each data portion belongs, date and time information of a most recent write or modification of said each data portion by the host computer, and date and time information of a most recent read access of said each data portion by the host computer.

18. A system for saving data originating from a host computer, the system comprising:

backup equipment including:

an input-output interface for exchanging data with the host computer, said input-output interface comprising a backup-reader inscriber emulator, wherein the host computer is one host from a heterogeneous set of host computers of at least two different types, said emulator configured to emulate one or more types of tape devices to enable a transparent dialogue between each of the different types of host computers and the backup equipment when saving data to the backup equipment from said each of the different types of host computers, at least one intermediate storage device, a tape reader-inscriber; and a processor for making transfers between the input-output interface or the intermediate storage device and the tape reader-inscriber, wherein said backup equipment stores a plurality of data portions from the host computer on a tape device, and, following each of said plurality of data portions on the tape device is a corresponding private data portion for said each data portion, said corresponding private data portion for said each data portion including private data about said each data portion and another corresponding private data portion associated with another data portion immediately preceding said each data portion on said tape device; and wherein the system also comprises:

a supervisor station, which is a separate component from the backup equipment and is connected to the backup equipment and the host, comprising a memory for saving information about records on a tape of the backup equipment, said supervisor station controlling the backup equipment as a function of instructions originating from the host computer, and a memory for using a database containing identification labels for backed up data, and wherein said private data of said corresponding private data portion for said each data portion includes a status code indicating a status of said each data portion, wherein said status code is a combination of bit indicators including a first bit indicator indicating whether said each data portion has a mirror copy on another tape, a second indicator indicating whether a copy of said each data portion is to be made on another mirror tape, a third indicator indicating whether said each data portion is shared between several host systems, a fourth indicator indicating whether said each data portion is always copied on a particular type of tape, and a fifth indicator indicating whether said each data portion is valid and is a most recent version of said each data portion or whether said each data portion is otherwise invalid.

19. A system for saving data originating from a host computer, the system comprising:

backup equipment including:
an input-output interface for exchanging data with the host computer, said input-output interface comprising a backup-reader inscriber emulator,
at least one intermediate storage device, and
a tape reader-inscriber; and the backup equipment also comprising:
a processor for making transfers between the input-output interface or the intermediate storage device and the tape reader-inscriber, wherein said backup equipment stores a plurality of data portions from the host computer on a tape device, and, following each of said plurality of data portions on the tape device is a corresponding private data portion for said each data portion, said corresponding private data portion for said each data portion including private data about said each data portion, wherein said corresponding private data is only written on the tape device and is ignored when transferring said each data portion from the tape device to restore said each data portion; and wherein the system also comprises:
a supervisor station, connected to the backup equipment and the host, comprising a memory for saving information about records on a tape of the backup equipment, said supervisor station controlling the backup equipment as a function of instructions originating from the host computer, and a memory for using a database containing identification labels for backed up data.

20. The system of claim 19, wherein said private data includes a status code indicating a status of said each data portion, said status code including an indicator indicating whether said each data portion is always copied on a particular type of tape.

* * * * *

UNITED STATES PATENT AND TRADEMARK OFFICE
CERTIFICATE OF CORRECTION

PATENT NO.      : 7,660,954 B2                                   Page 1 of 1
APPLICATION NO. : 10/343893
DATED           : February 9, 2010
INVENTOR(S)     : Jean-Marc et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Thirtieth Day of November, 2010

David J. Kappos
*Director of the United States Patent and Trademark Office*